United States Patent [19]
Hui

[11] Patent Number: 5,967,090
[45] Date of Patent: Oct. 19, 1999

[54] PET CAGE

[76] Inventor: Cheng Chen Hui, P.O. Box 453, Taichung, Taiwan

[21] Appl. No.: 08/995,351

[22] Filed: Dec. 22, 1997

[51] Int. Cl.⁶ .............................. A01K 1/00; A01K 31/07
[52] U.S. Cl. ............................................ 119/497; 119/453
[58] Field of Search .................................... 119/453, 496, 119/497

[56] References Cited

U.S. PATENT DOCUMENTS

| | | |
|---|---|---|
| 3,195,506 | 7/1965 | Beard ...................................... 119/496 |
| 5,357,900 | 10/1994 | Ho ........................................ 119/497 X |
| 5,669,331 | 9/1997 | Richmond ................................ 119/497 |

*Primary Examiner*—Robert P. Swiatek

[57] ABSTRACT

A pet cage consists of a cover, a base, two side plates, and end plate, and a door plate. The side plates are fastened between the base and the cover. The end plate is fastened with one end of the two side plates, whereas the door plate is fastened with another end of the two side plates. The pet cage can be disassembled to facilitate the shipping of the pet cage and made thinner for easy storage.

1 Claim, 5 Drawing Sheets

PET CAGE

FIELD OF THE INVENTION

The present invention relates generally to an animal cage, and more particularly to a pet cage.

BACKGROUND OF THE INVENTION

The conventional pet cages are generally rather cumbersome such that they take up a relatively large storage space, and that they can not be shipped easily and economically. In addition, the conventional pet cages are generally devoid of a built-in device to facilitate the disposal of the pet waste.

SUMMARY OF THE INVENTION

The primary objective of the present invention is to provide an improved pet cage free from the drawbacks of the conventional pet cages.

In keeping with the principle of the present invention, the foregoing objective of the present invention is attained by the improved pet cage consisting of a cover, a base, two longitudinal side plates, an end plate, and a door plate. The two longitudinal side plates are fastened between the base and the cover. The end plate is fastened with one end of the two longitudinal side plates, whereas the door plate is fastened with another end of the two longitudinal side plates. The longitudinal side plates are perforated to facilitate the circulating of air between the inside of the pet cage and the outside of the cage. The component parts of the pet cage are detachably assembled such that they can be separated for easy storage and shipment.

The foregoing objective, features, functions and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
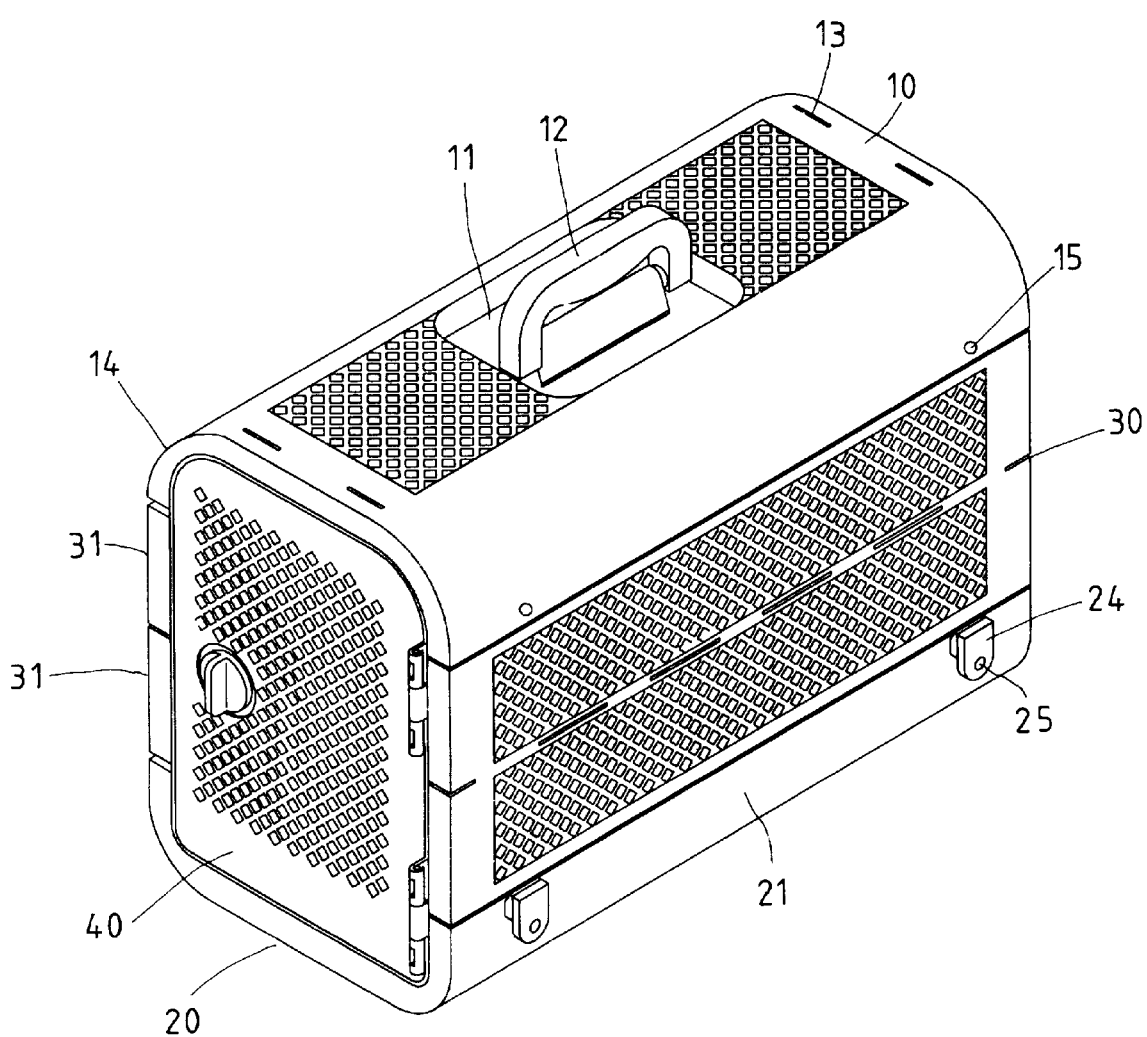
FIG. 1 shows a perspective view of the present invention.
Figure 2:
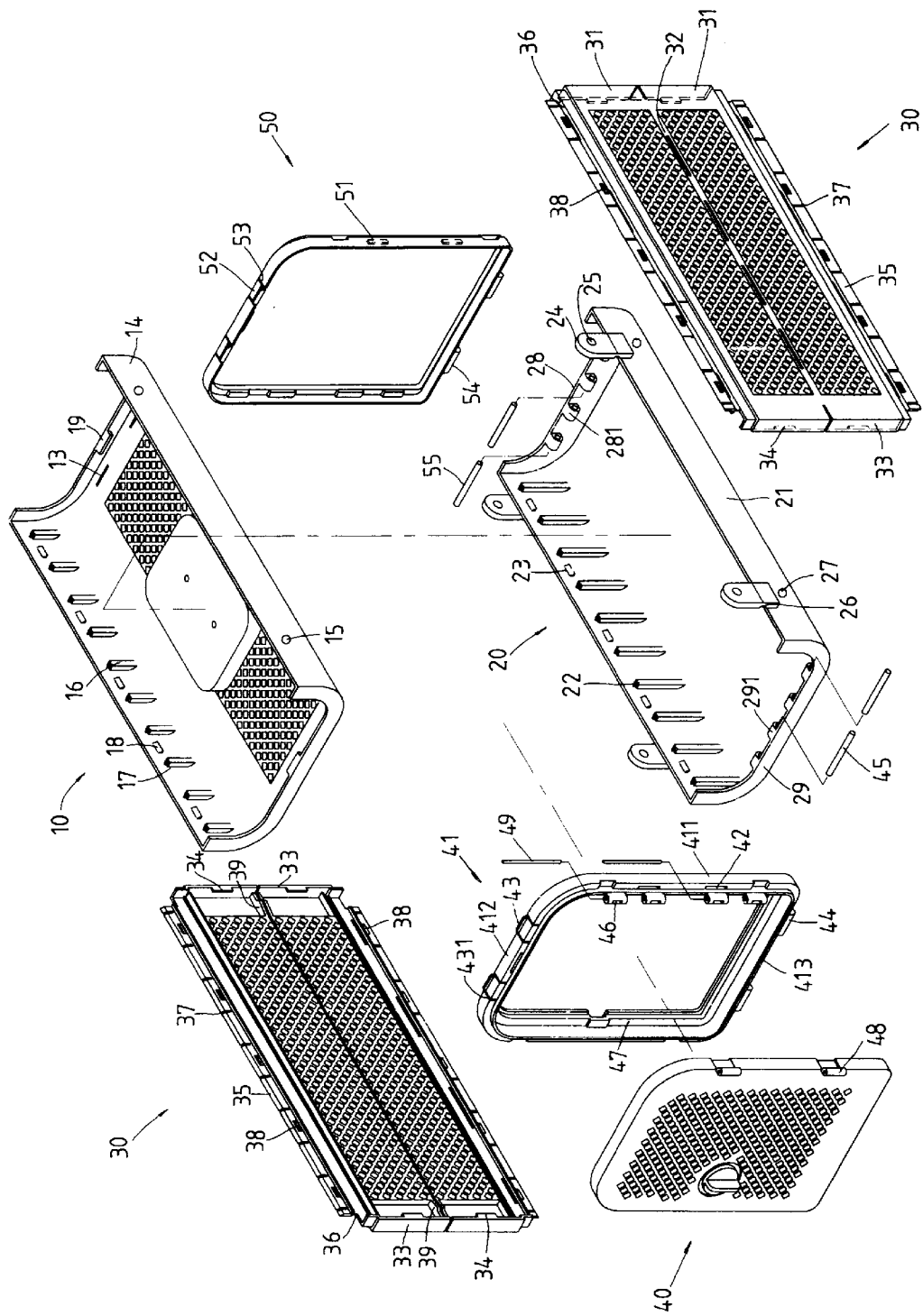
FIG. 2 shows an exploded view of the present invention.
Figure 3:
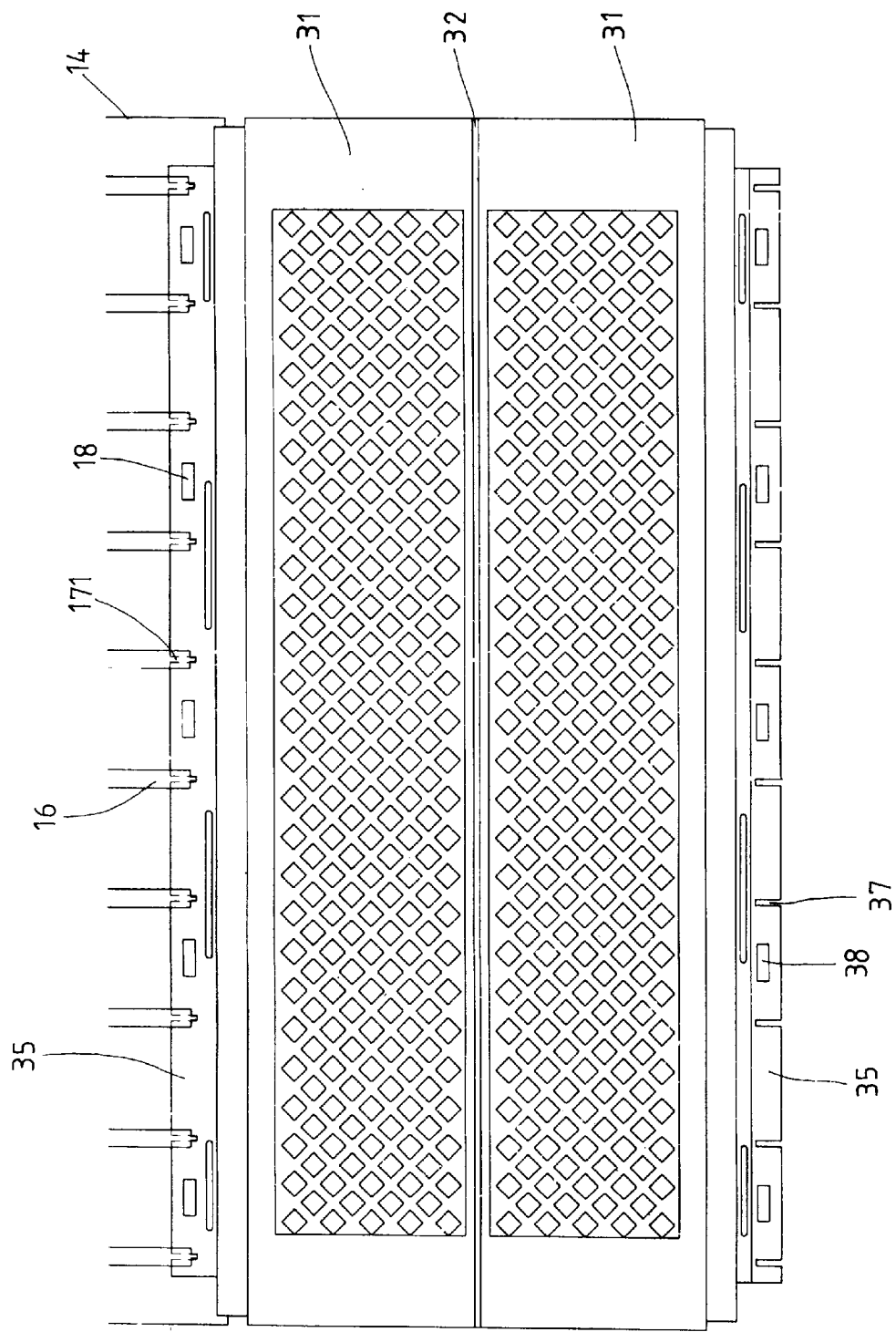
FIG. 3 shows a schematic view of the assembly of the present invention.

As shown in all drawings provided herewith, a pet cage embodied in the present invention is composed of a cover 10, a base 20, two longitudinal side plates 30, a door plate 40, and an end plate 50.

The cover 10 is provided at the center of the upper side thereof with a recess 11 for mounting a handle 12, and at both ends thereof with a plurality of slender holes 13. The cover 10 has two arcuate ends 14. The cover 10 is further provided along the longitudinal margin of the upper side thereof with a plurality of dimples 15. The arcuate ends 14 are provided respectively in the inner wall thereof with a plurality of arresting columns 16, retaining hooks 18. The cover 10 is further provided with two retaining pieces 19 located at both ends of the cover 10.

The base 20 is provided with longitudinal sides 21, a plurality of arresting columns 22 and retaining hooks 23. The longitudinal sides 21 are provided with a locating piece 24 and a plurality of protruded portions 25 engageable with the dimples 15 of the cover 10. Located between the locating piece 24 and the longitudinal sides 21 is a thin piece 26. The longitudinal sides 21 are provided with the dimples 27, a high arresting piece 28, a low arresting piece 29, and a plurality of cross tubes 281 and 291.

The perforated side plates 30 are composed of two long plates 33 connected with each other by means of a thin piece 32. The side plates 30 are provided with two frame sides 33 each having a retaining piece 34. Each side plate 30 is provided respectively at the top edge thereof and the bottom edge thereof with a long retaining piece 35 connected with the side plate 30 by a thin piece 36. The long retaining piece 35 is provided with a longitudinal hole 37 corresponding in location to the arresting columns 16 and 22, a cross hole 38 corresponding in location to the retaining hooks 18 and 23, and a long hook piece 39. The cross hole 38 is engaged with the retaining hooks 18 and 23.

The door plate 40 is formed of a door frame 41 and a door piece 40. The door frame 41 has two side frames 411 provided with a longitudinal hole 42 corresponding in location to the retaining piece 34. The door frame 41 has a top frame 412 provided with a locating hook 43 corresponding in location to the slender hole 13 of the cover 10 and having two slits 431. The door frame 41 further has a bottom frame 413 provided with a cross tubular body 44 corresponding in location to the cross tube 291 of the base 20. A pin 45 is engaged with the cross tubular body 44 and the cross tube 291. One of the two side frames 411 of the door frame 41 is provided with a longitudinal tubular body 46. The door frame 41 has a slotted side 47.

The end plate 50 is provided with two longitudinal holes 51 corresponding in location to the retaining piece 34 of the side plate 30, a locating hook 52 corresponding in location to the slender hole 13 of the cover 10, a slit 53, a cross tubular body 54 corresponding in location to the cross tube 281 of the base 20. The cross tubular body 54 and the cross tube 281 are engaged with a pin 55.

The cover 10, the base 20, two side plates 30, the door plate 40 and the end plate 50 are detachably assembled such that the long retaining piece 35 is located between the arresting column 22 and the longitudinal side 21 is engaged with the cross hole 38 of the long retaining piece 35, and further that the door frame 41 and the door plate 40 are fastened pivotally with both ends of the base 20, and still further that the end plate 50 is fastened with another end of the base 20, and still further that the retaining pieces 34 of the frame sides 33 are engaged respectively with the longitudinal holes 42 and 51. The cover 10 is joined with the top edges of the two side plates 30, the door plate 40 and the end plate 50 such that the long retaining pieces 35 of the side plates 30 are located respectively between the arresting columns 16 and the arcuate ends 14 of the cover 10, and that the retaining hook 18 is engaged with the cross hole 38 of the long hook piece 39, and further that the locating hooks 43 and 52 are engaged with the slender holes 13 of the cover 10.

The pet cage of the present invention can be washed with water or the cleaning solution. The cover 10 must be first disengaged with the side plates 30 so as to facilitate the washing of the interior of the pet cage. By using a hand tool, the locating hooks 43 and 52 are pressed such that they become disengaged with the cover 10, which can be then lifted slightly to move away from the top edges of the side plates 30.

Figure 4:
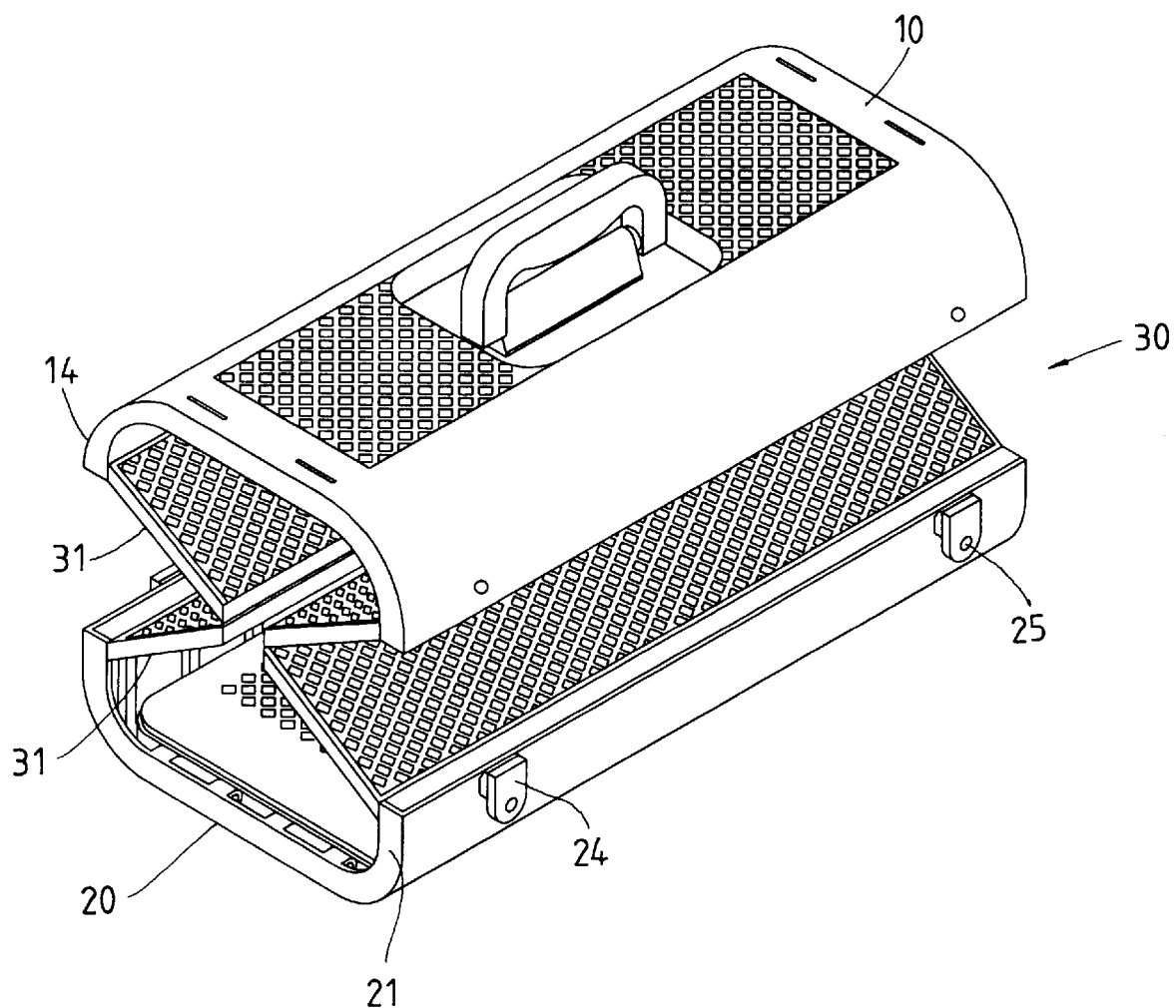
FIG. 4 shows a schematic view of the present invention.
Figure 5:
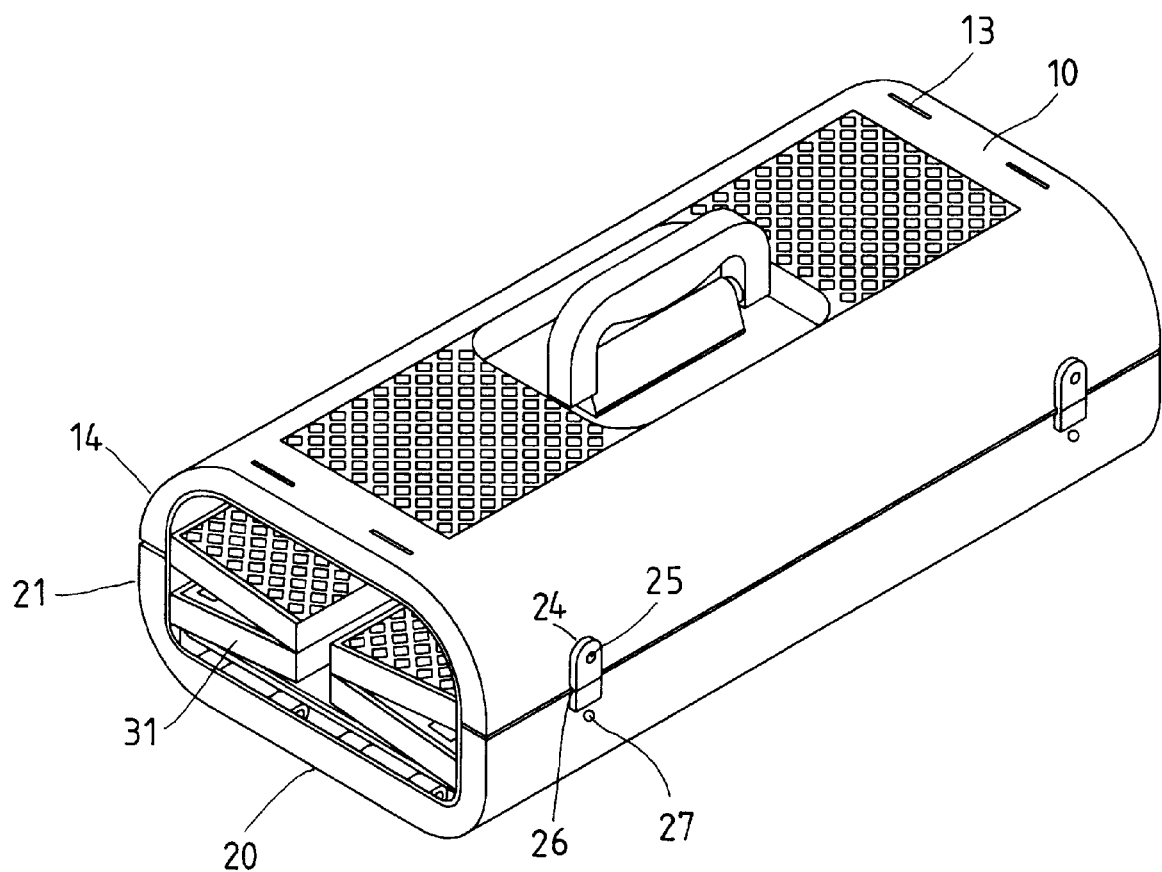
FIG. 5 shows another schematic view of the present invention.

As illustrated in FIGS. 4 and 5, the pet cage of the present invention can be made compact to facilitate the storing and the shipping of the pet cage. The door frame 41 and the end plate 50 are first disengaged with the cover 10 by pressing the locating hooks 43 and 52. The door frame 41 and the door plate 40 are pushed toward the base 20 before the end plate 50 is pushed toward the base 20. The side plates 30 are then pushed toward each other, as illustrated in FIG. 4, before the cover 10 is joined with the base 20. The locating pieces 24 are lifted such that the protruded portions 25 are located in the dimples 15 of the cover 10. As a result, the pet cage of the present invention is made thinner, as shown in FIG. 5.

What is claimed is:

1. A pet cage comprising:

a cover provided at a center of an upper side thereof with a handle fastened therewith, a plurality of slender holes, two arcuate ends, a plurality of dimples, and two retaining pieces located at both ends thereof, said arcuate ends provided in an inner wall thereof with a plurality of arresting columns and retaining hooks;

a base provided with two longitudinal sides, a plurality of arresting columns and retaining hooks, said longitudinal sides provided with a locating piece, a plurality of protruded portions engaged with said dimples of said cover, a plurality of dimples, a high arresting piece, a low arresting piece, and two cross tubes;

two perforated side plates each having two long plates connected with each other by a thin piece, said side plates provided with two frame sides each having a retaining piece, and two long retaining pieces each having a longitudinal hole corresponding in location to said arresting columns of said cover and said base, a cross hole corresponding in location to said retaining hooks of said cover and said base, and a long hook piece;

a door plate formed of a door frame and a door piece, said door frame having two side frames provided with a longitudinal hole corresponding in location to said retaining piece of said frame sides of said side plates, said door frame further having a top frame provided with a locating hook corresponding in location to said slender hold of said cover and having two slits, said door frame still further having a bottom frame provided with a cross tubular body corresponding in location to said cross tube of said base, one of said two side frames of said door frame provided with a longitudinal tubular body; and an end plate provided with two longitudinal holes corresponding in location to said retaining piece of said side plate, a locating hook corresponding in location to said cross tube of side base;

said cover, said base, said side plates, said door plate and said end plate being detachably assembled such that said side plates are mounted on said base, and that said cover is joined with top edges of said side plates, and further that said door plate is fastened pivotally at one end of each of said side plates, and still further that said end plate is fastened with another end of each of said side plates, and still further that said long retaining pieces of said side plates are located between said arresting columns of said base and said longitudinal side of said base, and still further that a retaining hook is engaged with said cross hole of a long retaining piece of said side plates, and still further that said door frame and said door plate are fastened pivotally with both ends of said base, and still further that said retaining pieces of said frame sides are engaged respectively with said longitudinal holes of said door plate and said end plate.

* * * * *